Figure 5:
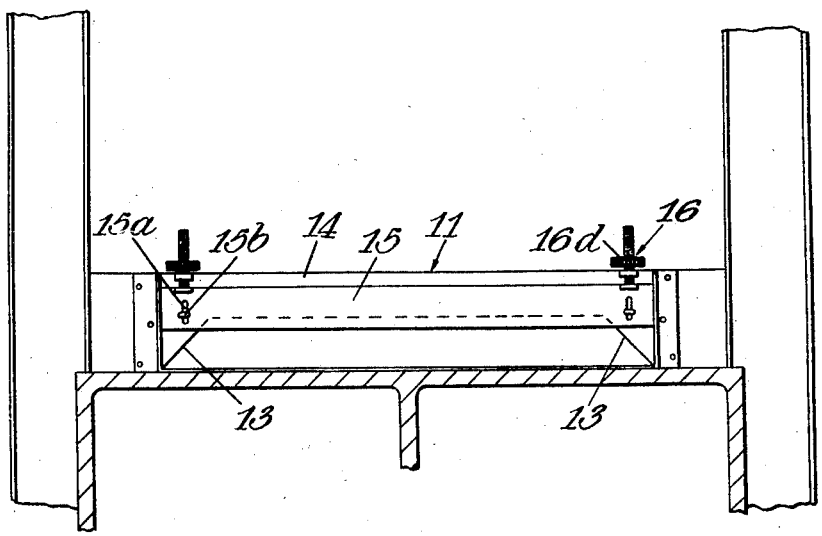

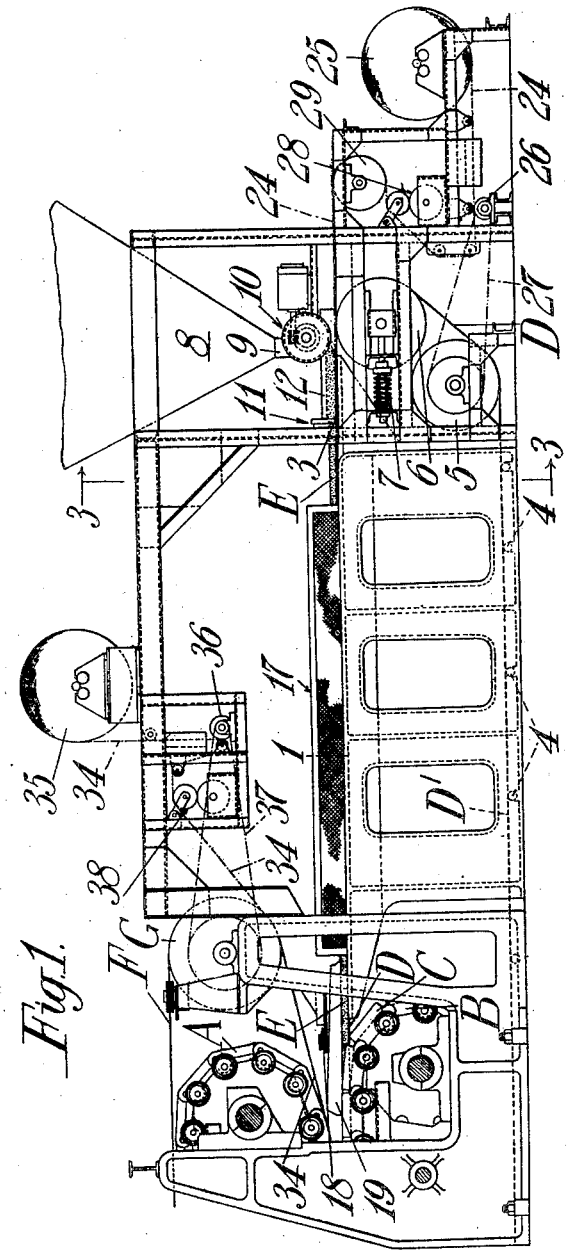

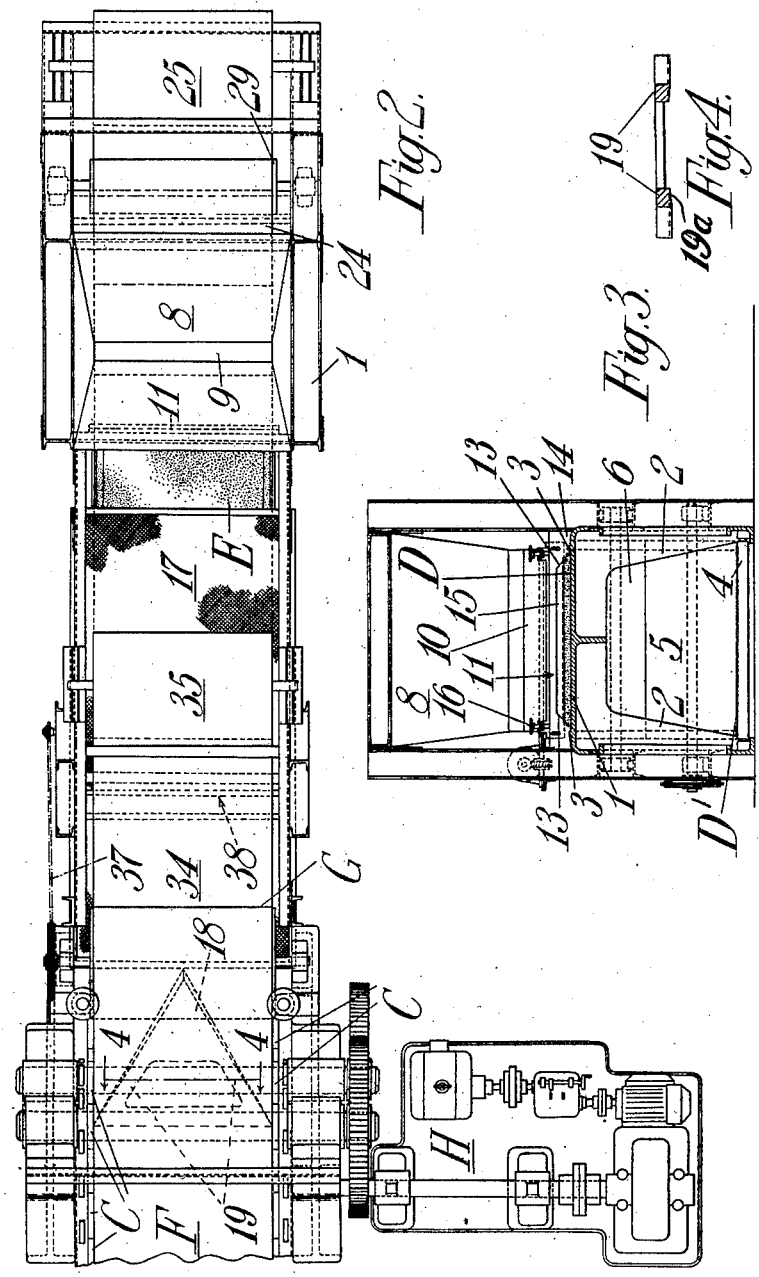

Dec. 30, 1952 W. J. FISCHBEIN 2,623,239
METHOD AND APPARATUS FOR FEEDING COMMINUTED
BOARD-FORMING MATERIAL FOR PRESSING
Filed Nov. 18, 1949 4 Sheets-Sheet 3

Inventor
W. J. Fischbein
By Mason & Downing Recht
Attys

Patented Dec. 30, 1952

2,623,239

UNITED STATES PATENT OFFICE 2,623,239

METHOD AND APPARATUS FOR FEEDING COMMINUTED BOARD-FORMING MATERIAL FOR PRESSING

William James Fischbein, London, England, assignor of one-half to British Artificial Resin Company Limited, London, England Application November 18, 1949, Serial No. 128,198
In Great Britain November 24, 1948

4 Claims. (Cl. 18—5)

This invention relates to a machine or apparatus for laying a mat or layer of board-forming material upon a continuously travelling band for preliminary heat treatment thereof by radio frequency current before continuously feeding such between pressure members to consolidate and gauge the mass for the production of a board of predetermined consistency and thickness.

This invention further relates to a method of and apparatus for preparing a mat of board-forming material on a continuously travelling band conveyor for subsequent treatment under continuously moving consolidating pressure means operating between lateral material confining flanges.

By the terms "board-forming material" is meant any discrete material or composition suitable for radio frequency heat treatment such as, for example, a powdered setting plastic with or without a comminuted filler or fillers, or a comminuted powdered material or composition such as wood powder, sawdust, powdered cork, or finely chopped pulverized cellulosic or other material suitable for radio frequency heat treatment, mixed with a powdered or comminuted binder; and the term "plastic" is intended to include thermo-softening or thermo-setting plastics or rubber or rubber-like materials.

The term "board" is intended to include flexible or relatively stiff products having a large superficial area as compared with their thickness and made in continuous web form or long sheets. The product may vary from webs or sheets of the order of $\frac{1}{16}$ of an inch to an inch or more and is especially suitable for a wall boarding or paneling.

In heating a dielectric material of the character indicated, whilst travelling between radio frequency electrodes there is difficulty in forming the margins accurately so that the width of the material is uniform and its edges are regular, for the reason that metallic deckle edges or flanges are unsuitable for laterally confining the material whilst undergoing radio frequency treatment as such afford a conducting path for the current and interfere with the uniformity of heat treatment. The use of deckle edges or flanges of insulating or refractory material is inappropriate having regard to the subsequent mechanical treatment, being more or less fragile or otherwise incapable of receiving the lateral thrust of the material when subjected to the consolidating and gauging pressure.

An aim of the present invention is to overcome or circumvent the above difficulties and to produce a mat of material which after radio frequency heat treatment is delivered to lie uniformly from margin to margin between the deckle edges in the pressing operation such that the final board-like product possesses well formed or moulded edges.

The invention consists in forming a mat of board-forming material of greater thickness and less width than the corresponding dimensions of the finished board upon a continuously moving band conveyor travelling towards a radio frequency heating zone preparatory to consolidation between continuously moving pressure members having deckle edges or lateral flanges to confine the mat when under pressure, and as the mat is about to be fed between said edges or flanges, displacing some of the material outwardly to contact and abut against the edges or flanges to mould the margins of the material uniformly to the desired width.

According to one mode of making the mat, a quantity of the material somewhat in excess of that required for forming the mat is deposited or spread on the band and is then operated upon preliminarily to determine the thickness, width and margin of the mat as required for heat treatment, by forming means such as an inverted weir or dam device or devices operating as a strickler. It is preferred to shape the margins of the mat to a bevel corresponding with the angle of repose of the material such that after heat treatment some of it may be displaced outwardly to build up the bevelled margins to vertical edges against the deckles, as by the employment of a second forming means which may be constituted by a strickling device or other device or devices adapted to afford the required displacement of material from the centre outwards.

Further features of the invention will hereinafter appear.

Figure 6:
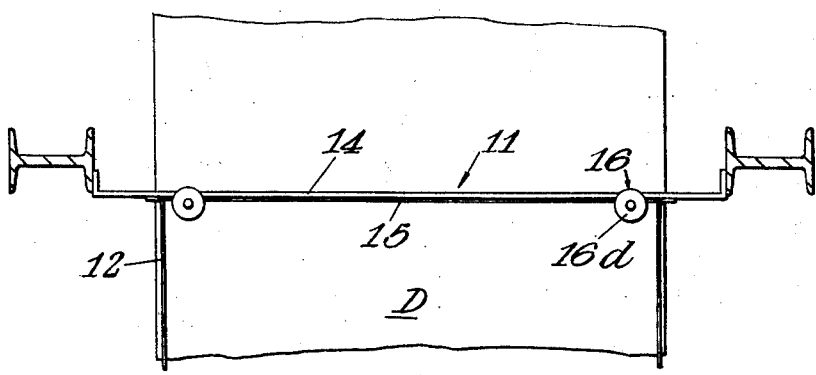
Figure 7:
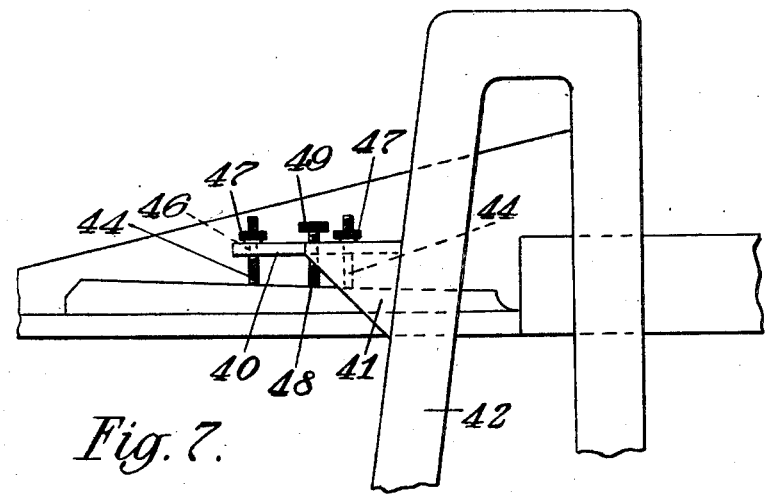
Figure 8:
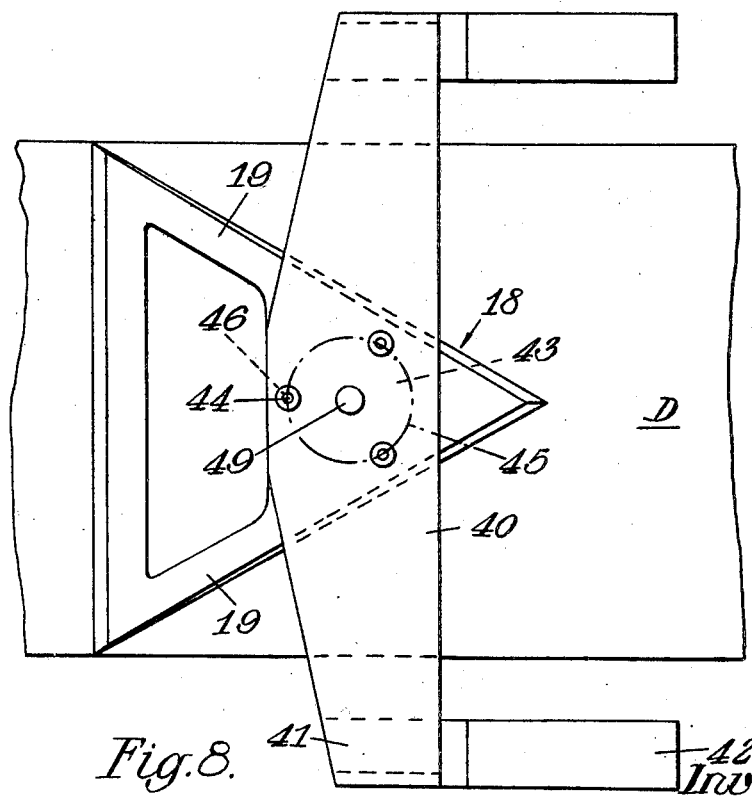

In the accompanying drawings:

Figure 1 shows a machine for the preparatory forming a mat of board-forming material according to the present invention, Figure 2 is a plan view of the machine shown in Figure 1, Figure 3 is a transverse section of the machine on the line 3—3 of Figure 1, Figure 4 is a section of a part of the machine on the line 4—4 of Figure 2, Figures 5 and 6 are detailed side elevation and plan views respectively of the first strickling device of the machine, and Figures 7 and 8 are detailed side elevation and plan views respectively of the second strickling device of the machine.

In carrying the invention into effect according to one convenient mode, as applied, by way of example, to the production of a wall or like boarding comprising, for example, a mixture of sawdust and a powdered thermosetting plastic bond, such as urea formaldehyde, the machine to be described is positioned in longitudinal extension of a continuously operating pressure applying means for which it forms the feed. The pressure applying means, hereafter referred to as the "pressing machine," may comprise an upper and a lower continuously travelling endless chain of platens arranged in caterpillar fashion to form rectilinear upper and lower pressure beds in adjacent laps of the chains. This pressing machine may be as described in Fischbein's United States of America patent application No. 128,198 dated November 18, 1949, and the commencement of such a machine is shown on the left of Figure 1, having upper caterpillar chain platens A and lower caterpillar chain platens B constituting consolidating pressure means. The platens B have at their margins upright flanges or deckle edge members C constituting lateral material confining flanges and between which an endless metal band D travels at the same rate as the caterpillar chain to support the material E for pressure treatment. An upper endless metal band F co-operates similarly with the upper caterpillar chain platens A to form the upper surface of the material during pressing and passes round a large diameter return roll G. The upper and lower caterpillar chain platens A and B are conveniently driven from a suitable source of power generally indicated in Figure 2 at H, of known character and forming no part of the present invention.

The lower endless band D extends forwardly from the pressing machine into the feed machine in which it is carried by a bed 1 supported by stanchions 2 forming the frame of the machine. The extended band D affords a mat laying station and is maintained in position between two spaced fillets 3 running longitudinally of the bed. The return lap D' of the band D passes from the pressing machine and runs under the bed 1 and between the stanchions 2 on small rollers 4 and beyond the end of the bed is changed as to direction by a pair of rollers 5 and 6, the upper roller 6 of which is slidably mounted on the machine frame and biased by springs 7 to maintain tension in the band. After passing round the roller 6 the band passes under the delivery point of the dry comminuted material from which the mat is to be formed, which mat is of somewhat greater cubical content than that required for the finished product. Fresh material is supplied continuously to maintain a constant feed of material into the machine. In other words, a layer of discrete particles of board-forming material is continuously deposited upon the conveyor to a depth sufficient to form a mat of greater thickness and less width than the corresponding dimensions of a board to be produced by the subsequent treatment under the consolidating pressure means. As shown, the delivery of the material is from a hopper 8 supported above the band D adjacent the end of the bed 1 and having a delivery mouth 9 extending transversely across the width of the band D. The feed of the material from the hopper is controlled by any known feeding device, for example of the drum and rotating paddle type as generally indicated at 10.

The mat material laid on the band D travels forward therewith and meets a strickling means device in the form of an inverted weir or dam 11 carried by the apparatus and under which the material is passed and in its passage is gauged as to its shape, thickness and width, surplus material being continuously held back and contained between short side walls 12 terminating at the weir 11. The major portion of the width of the weir is rectilinear and spaced from the band D a distance equal to the thickness predetermined for the mat at this point in its travel. The margins 13 of the strickler or weir are bevelled at an angle of 45° or other angles of repose of the powdered or comminuted mixture so that the material is carried from the strickler or weir as a uniform mat having bevelled edges or margins lying within the vertical planes of the deckle edge members C of the lower caterpillar chain platens B of the pressing machine. Thus it follows that the weir or strickling means strickles each lateral edge of the layer of material or mat after depositing, so that the lateral edges assume a bevel at an angle in accordance with the natural angle of repose of the material at which the material of the lateral edges of the layer will not move downwardly of its own accord toward the lateral edges of the conveyor.

In order to allow for adjustment of the spacing of the strickler or weir 11 above the band D while providing the mat passing thereunder with bevelled edges or margins at all spacings, the weir 11 is made in two parts, Figure 5, namely, a fixed plate 14 which incorporates the bevelled margins 13 and a movable part 15 which constitutes the operative rectilinear strickling portion. By adjustment of the height of the part 15, the spacing of the rectilinear strickling edge may be varied as desired according to the gauge required for the mat at this point; a convenient screw mechanism 16 is provided for making such adjustments, as seen from Figures 3 to 6.

The gauged mat thus formed is carried forward into a radio frequency heating zone, generally indicated at 17, wherein the mat receives a uniform heat treatment to condition the plastic constituent of the mixture to an appropriate consistency to act as a binder for the sawdust when subjected to pressure. The radio frequency heat treatment means is of any suitable known character and may comprise an upper electrode or electrodes (not shown), spaced above the mat at a suitable distance and a lower electrode which may conveniently be constituted by earthing the metal band D. The nature and construction of the radio frequency heat treatment means does not form any part of the invention.

After the strickled material on the conveyor has been passed through the radio frequency heating stage, that is as the mat of material emerges from the radio frequency heat treatment zone it meets a second forming means preferably constituted by another strickling device or devices 18 disposed in the path of travel of the deposited mat and which is adapted to strickle the top of the layer or mat to a depth sufficient to spread or displace some of the material laterally outwardly from the center to rest against and be supported by, or in other words to come into contact with the deckle edge members C of the lower caterpillar platen chain B of the pressing machine, which deckle edge members C coincide with the margins of the band D.

As illustrated, the second strickling device 18 comprises a triangular structure carried by the apparatus and having a pair of strickling blades 19 arranged, as viewed in plan as a V, the point of which is disposed towards the oncoming mat E of heat treated material. The leading edges of the blades 19 are rearwardly bevelled in plough-like manner and their under surfaces are relieved as at 19a from the strickling edge, as shown in Figure 4. The effect of the second strickling device 18 is to gauge the mat of material to the final thickness required before consolidation and to spread the margins of the mat to meet and abut against the deckle edge members C. With this end in view it will be appreciated that the width of the mat as it meets the second strickler 18 may not be substantially less than the width between the deckle edge members C as this latter strickling operation may move only sufficient material as is required to make up the bevelled edges of the mat to the squared-up margin at the deckle edge members C. The ends of the second strickler 18, remote from its V-point, terminate in or about the vertical planes of the deckle edge members C and control the mat until it comes under the charge of such edge members; further the height of the strickler 18 above the band D is adjustable to conform with adjustments of the rectilinear part 15 of the first strickler or weir 11.

The adjustable mounting, see Figures 7 and 8, of the second strickling device 18 comprises a beam 40 secured by brackets 41 to the nearby structure 42 of the machine. At the apex of the device 18, between the arms 19, is a plate 43 to which are fixed three threaded posts 44, located at 120° apart on a circle 45 of, say, 12" diameter, which pass through corresponding holes 46 in the beam 40. Knurled nuts 47 are threaded on the posts 44. At the centre of the circle 45, a threaded post passes through the beam 40 and is in threaded engagement therewith, its lower end engaging the surface of the plate 43 of the strickling device 18. The post 48 has a knurled head 49 by which it can be manually rotated and so moved upwardly or downwardly in the beam 40. To adjust the height or cant of the strickling device 18, the nuts 47 are first adjusted as required, after which a tightening and locking force is applied by screwing post 48 down onto the plate 43.

In connection with the details of the adjusting means, that is the elements 44 to 49, it is pointed out that the same per se do not form any part of the present invention since numerous means and arrangements can be embodied to provide the adjustability of the second strickling device 18 and the means illustrated merely constituting an example of one operative arrangement.

After leaving the second strickling device 18, the mat is carried on by the band D into a pressing machine for consolidation and finishing.

The mat E of board-forming material, the forming and preliminary treatment of which has been described in the foregoing, may be laid directly on the band D as referred to above or upon a continuous web of paper, fabric or other material fed over the band D in order that the paper or other material may serve as a smooth or otherwise textured continuous surface which is subsequently embodied or adhesively secured to the board as finally delivered after receiving consolidated pressure. Similarly, if desired, the upper surface of the mat may have laid upon it a covering sheet of paper, fabric or other material in the form of a continuous web applied after the second strickling operation and before or as the mat passes to the pressing machine. The means for laying the paper or other webs may be of any known type adapted to draw paper from a reel and lay it upon the band D or over the mat and in both cases the paper may be coated with a plastic or other adhesive by means of gumming rollers or like devices of known character.

Thus, as illustrated, a web 24, for example, of paper is led from a reel 25 over a roller 26 adapted to draw the web from the reel at a rate equal to the rate of travel of the metal band D. The roller 26 is driven as by a chain drive indicated at 27 from the drum 5 carrying the band D, the ratio of the drive being such that the peripheral speed of the roller 26 is equal to that of the drum 5. The web 24 is fed by the roller 26 through a gumming plant 28 of known type and around a change-direction roller 29 which aligns the web 24 on the level of the bed 1 so that the web is fed on to the band D before the mat material is deposited thereon from the hopper 8.

A similar web 34 is laid on top of the mat E prior to its consolidation in the pressing machine and is drawn from a reel 35 mounted on the machine framework above the band D. The rate of feed of the upper web 34 is equal to the rate of travel of the upper metal band F of the pressing machine which rate is equal to that of the lower band D. Thus, the web 34 is drawn from the reel 35 by a roller 36 driven as by a chain drive 37 from the drum G carrying the band F, the ratio of the drive being, as described above, such as to provide the roller 36 with a peripheral speed equal to that of the drum F. The web 34 then passes over a gumming plant 38 similar to the gumming plant 28 and is led off to lie against the upper band F as it is drawn into the pressing machine to overlie the mat E.

It is to be understood that the machine described above is only one example.

It is to be understood that the foregoing description is concerned with only one example of a machine for carrying out the preliminary step of continuously forming a mat of board-forming material according to the present invention. Thus the supporting of the band D, the feed of the discrete mixture to the band, and the feed of paper or other webs to underlie and overlie the mat may be provided by any convenient known means.

I claim:

1. A method of preparing a mat of board-forming material on a continuously travelling band conveyor for subsequent treatment under continuously moving consolidating pressure means operating between lateral confining flanges comprising continuously depositing upon said conveyor a layer of discrete particles of board-forming material to a depth sufficient to form a mat of greater thickness and less width than the corresponding dimensions of a board to be produced by the consolidating pressure means, strickling each lateral edge of the layer of material after depositing at an angle in accordance with the natural angle of repose of the material at which the material of the lateral edges of the layer will not move downwardly of its own accord toward the lateral edges of the conveyor, passing the strickled material on said conveyor through a radio frequency heating stage and thereafter strickling the top of the layer to a depth sufficient to displace some of the material laterally outwardly into contact with the lateral confining flanges of the pressure means so that the edges of the layer may be moulded thereby when the layer is consolidated by the pressure means.

2. Apparatus for preparing a mat of boardforming material for subsequent treatment under a continuously moving consolidating pressure means comprising spaced lateral material confining flanges, said apparatus comprising radio frequency heating means defining a heating zone through which the material passes, a continuously moving band conveyor including lateral edges travelling through said heating zone for conveying material toward a consolidating pressure means, means for continuously depositing boardforming material as a mat on the band conveyor, strickling means carried by the apparatus and disposed in the path of travel of the deposited mat in advance of the radio frequency heating means for strickling the material of the lateral edges of the mat so that the lateral edges thereof assume a bevel at an angle in accordance with the natural angle of respose of the material at which the material of the lateral edges of the mat will not move downwardly of its own accord toward the lateral edges of the conveyor and a second strickling means carried by the apparatus and disposed in the path of travel of the mat after the radio frequency heating means for strickling the top of the mat and displacing some of the material of the mat laterally outwardly into contact with the lateral confining flanges to eliminate the bevels.

3. Apparatus for preparing a mat of boardforming material as claimed in claim 2, wherein the first mentioned strickling means comprises a fixed part having lateral portions with inclined strickling edges adapted to bevel both edges of the mat and a movable part with a horizontal rectilineal strickling edge adapted to form the upper surface on the mat, the spacing of the horizontal rectilineal strickling edge being adjustable above the surface of the band conveyor.

4. Apparatus for preparing a mat of boardforming material as claimed in claim 2, wherein the second strickling means comprises a pointed plough-like member having its undersurface in contact with the upper surface of the mat, its point facing in the direction of the oncoming mat and side portions diverging rearwardly from the point to en dsubstantially in the vertical planes of the said lateral flanges.

WILLIAM JAMES FISCHBEIN.

REFERENCES CITED

The following references are of record in the file of this patent:

UNITED STATES PATENTS

| Number | Name | Date |
|---|---|---|
| 813,171 | Pohl | Feb. 20, 1906 |
| 1,342,192 | Trevillian | June 1, 1920 |
| 2,039,204 | Young | Apr. 28, 1936 |
| 2,161,308 | Murphy et al. | June 6, 1939 |
| 2,463,288 | Leguillon | Mar. 1, 1949 |
| 2,340,834 | Hanson | Feb. 1, 1944 |